Aug. 24, 1954   E. O. SCHONSTEDT   2,687,507
METHOD AND APPARATUS FOR MEASURING THE
EARTH'S TOTAL MAGNETIC FIELD VECTOR
Filed Sept. 29, 1950   7 Sheets-Sheet 1

INVENTOR.
E. O. SCHONSTEDT
BY
J. D. O'Brien
R. M. Hicks ATTYS

Aug. 24, 1954

E. O. SCHONSTEDT 2,687,507

METHOD AND APPARATUS FOR MEASURING THE
EARTH'S TOTAL MAGNETIC FIELD VECTOR

Filed Sept. 29, 1950

INVENTOR.
E. O. SCHONSTEDT
BY
*G. D. O'Brien*
*R. M. Hicks*  ATTYS

Aug. 24, 1954   E. O. SCHONSTEDT   2,687,507
METHOD AND APPARATUS FOR MEASURING THE
EARTH'S TOTAL MAGNETIC FIELD VECTOR
Filed Sept. 29, 1950   7 Sheets-Sheet 3

INVENTOR.
E. O. SCHONSTEDT
BY
G. D. O'Brien
R. M. Hicks ATTYS

Aug. 24, 1954

E. O. SCHONSTEDT 2,687,507

METHOD AND APPARATUS FOR MEASURING THE
EARTH'S TOTAL MAGNETIC FIELD VECTOR

Filed Sept. 29, 1950

INVENTOR.
E. O. SCHONSTEDT
BY
ATTYS

Aug. 24, 1954     E. O. SCHONSTEDT     2,687,507
METHOD AND APPARATUS FOR MEASURING THE
EARTH'S TOTAL MAGNETIC FIELD VECTOR
Filed Sept. 29, 1950     7 Sheets-Sheet 7

INVENTOR.
E. O. SCHONSTEDT

Patented Aug. 24, 1954

2,687,507

UNITED STATES PATENT OFFICE 2,687,507

METHOD AND APPARATUS FOR MEASURING THE EARTH'S TOTAL MAGNETIC FIELD VECTOR

Erick O. Schonstedt, Washington, D. C.

Application September 29, 1950, Serial No. 187,653

1 Claim. (Cl. 324—43)

(Granted under Title 35, U. S. Code (1952), sec. 266)

The present invention relates to a method and apparatus for measuring and recording the earth's total magnetic field vector.

Related prior art devices such, for example, as Patent No. 2,427,014 issued to W. J. Means for Orienting Device, have been employed for measuring and recording the intensity of the total magnetic field for the purpose of locating magnetic bodies from an aircraft in flight.

The present invention comprises apparatus which continuously measures and records the intensity of the earth's magnetic field, as in the prior art device and, in addition thereto, measures and records data from which are computed the magnetic heading of the aircraft, horizontal, vertical, the north, and east components and the angles of inclination and declination of the earth's total magnetic field vector. In other words, continuous recordings are made, during the flight of an aircraft containing the apparatus of the present invention, of the intensity of the total magnetic field, the true heading of the aircraft as provided by a directional gyro, the angular displacements about the gimbal axes of the detector head employed to detect the magnetic field, variations of attitude of the aircraft and apparatus from true vertical with respect to the earth, and the relative bearing of the aircraft with respect to the sun's azimuth from which the true heading of the aircraft is obtained.

As aforementioned the apparatus of the present invention measures the intensity of the total magnetic field and correlates such information with measurements of the angular position of the axis of the magnetometer detector element with respect to the aircraft in which it is mounted, whereby the total field is defined by components in a rectangular coordinate system fixed with respect to the aircraft and including the longitudinal centerline of the aircraft.

It will be understood, of course, that while the longitudinal centerline of the aircraft is selected as a reference in the coordinate system, any other line defined by a particular position of the detector head may be selected as the reference. In practice, the detector head is adjusted so as to bring the longitudinal centerline thereof into parallelism with the centerline of the aircraft whereby the latter may be utilized as a reference in the rectangular coordinate system.

The apparatus of the present invention also measures the angular position of the aircraft with respect to true vertical whereby the total field intensity is defined by components in a rectangular coordinate system including true vertical and the horizontal component of the longitudinal centerline.

In order to determine true heading, whereby the total field intensity is defined by components in a rectangular coordinate system including true north and true vertical, a pendulum stabilized sun compass is provided which is mounted in the astral dome of the aircraft. The sun compass has associated therewith a camera whereby photographs of the dial readings thereof are made at timed intervals, thus providing a record from which, together with the solar time and geographic position, the true heading of the aircraft may be computed.

As pendulum stability is affected during turns, a continuously recording directional gyroscope is provided for measuring and recording the heading of the aircraft when forces developed during turns are of sufficient amplitude to adversely affect the accuracy of the sun compass.

A recording is made of the variations in the direction of travel or heading of the aircraft as evidenced by the directional gyroscope by employing a potentiometer having its wiper arm attached to the operated shaft of the gyroscope. The potentiometer forms a part of a bridge circuit, the unbalance of which is recorded by a recording milliammeter.

Readings of the angular position of the magnetometer detector element are provided by a pair of potentiometers mounted about the two axes of the gimbal mounting of the detector element to indicate the angular variations thereof about these axes, such indications being recorded on tape by graphic milliammeters individual to and in closed circuit relation with the potentiometers.

The position of the aircraft with respect to vertical is measured by providing an oil-damped gimbal mounted pendulum having a pair of potentiometers connected about the gimbal axis thereof in such a manner as to measure the angular variations of the aircraft with respect to the pendulum; these potentiometers also being in closed circuit relation with graphic milliammeters individual thereto so that tape recordings may be made of such angular variations.

Since the pendulum will be inaccurate during accelerations and decelerations of the aircraft, all of the data taken by the magnetometer at such times, the total intensity data being excepted, are averaged for a period of about two minutes during which time the acceleration of the aircraft averages approximately zero. During periods when the aircraft accelerates in pitch and roll directions the deviations can be measured by means of a vertical reference gyroscope, or in regions where the earth's magnetic field assumes high dip angles, by means of the measurements of the angular motion of the detector coil with respect to the gimbal mounting.

In this manner the angular position of the magnetometer with respect to a true vertical from the earth is made known throughout the entire period of a survey flight, and as hereinbefore stated astral readings are measured and recorded at regular intervals to ascertain the aircraft heading and under some circumstances to fix the position of the magnetometer with respect to latitude and longitude. It will, thus, be apparent that there is provided a system which accurately measures and records data indicative of the angular position of the magnetometer with respect to the earth at all times during a survey flight, thereby providing data from which are computed accurate values of components of the total field intensity and the direction of the earth's magnetic field at all points along the line of flight.

The present invention is of advantage in securing data relating to the properties of the earth's magnetic field which are of value in navigation, geophysical prospecting and specialized fields of development and research in terrestrial magnetism. Since there are few regions on the earth's surface where the compass needle points true north, it is important in securing accurate measurements for use in navigation, for example, to know the degree of deviation of the reading of the compass needle from true north in any given region. It is, also, important in the use of magnetic instruments in geophysical surveys where the nominal values of the earth's magnetic field are employed to correct the results of such surveys in view of the regional gradient in order to more accurately define the anomalies in the earth's crust in the region being surveyed. It is, likewise, of importance in the degaussing of ships and in the design of magnetic mines to have a knowledge of the regional values of the earth's magnetic field.

The resulting information secured by the system and apparatus of the present invention may readily be assembled in the form of a chart, such chart being of great benefit in arriving at a correct reading of the earth's total magnetic field vector in any of the foregoing problems relating to the earth's magnetic field.

An object of the present invention is to provide a new and improved method of determining values relating to the earth's total field vector from an aircraft in flight, which values heretofore have been obtained by measurements made on the ground.

Another object is to provide new and improved airborne apparatus for measuring and recording data from which to compute values relating to the earth's total field vector.

Still another object of the invention is to provide a method and apparatus for measuring and recording the intensity of the earth's total magnetic field and simultaneously therewith for measuring and recording data from which to compute the dip angle and the angle of declination or degree of variation of the magnetic heading with respect to true north.

A further object is to provide a system and apparatus for measuring and recording the intensity of the earth's total magnetic field and simultaneously therewith for measuring and recording data from which to compute the vertical and horizontal components of the field.

A still further object is to provide means for recording and coordinating a continuous magnetometer reading of the total magnetic field of the earth from an aircraft in flight with the angular position of the magnetometer in relation to the earth and with the precise heading of the aircraft at all times during such flight.

A still further object is to provide a new and improved system for quickly and accurately measuring and recording data relating to the earth's total magnetic field vector over a large area.

Still another object is to provide a system and apparatus for measuring the earth's total magnetic field vector by which tape recordings of a plurality of measurements relating thereto are coordinated to produce a chart indicative of such phenomena.

An additional object resides in a new and improved method of converting measurements of the earth's total field vector to components in a rectangular coordinate system fixed with respect to the aircraft, converting the aircraft components to components in a rectangular coordinate system taken with respect to the aircraft heading and having a true vertical coordinate and, thereafter converting the last mentioned components to components in a rectangular coordinate system including true vertical and true north.

Still another object is to provide a method of determining true vertical from an aircraft in flight by averaging variations in the aircraft attitude, as measured and recorded by a pendulum, over spaced intervals of short duration.

Other objects and many of the attendant advantages of this invention will be readily appreciated as the same becomes better understood by reference to the following detailed description when considered in connection with the accompanying drawings wherein.

Referring more particularly to the drawings wherein like numerals indicate like parts throughout the several views, an aircraft capable of long periods of sustained, smooth flight is indicated generally at 10 in which are mounted a magnetometer assembly 11, a control panel 12, a plurality of recording oscillographs indicated generally at 13, a pendulum assembly 14, a sun compass 150, and other associated apparatus which will be more thoroughly described hereinafter.

Figure 1:
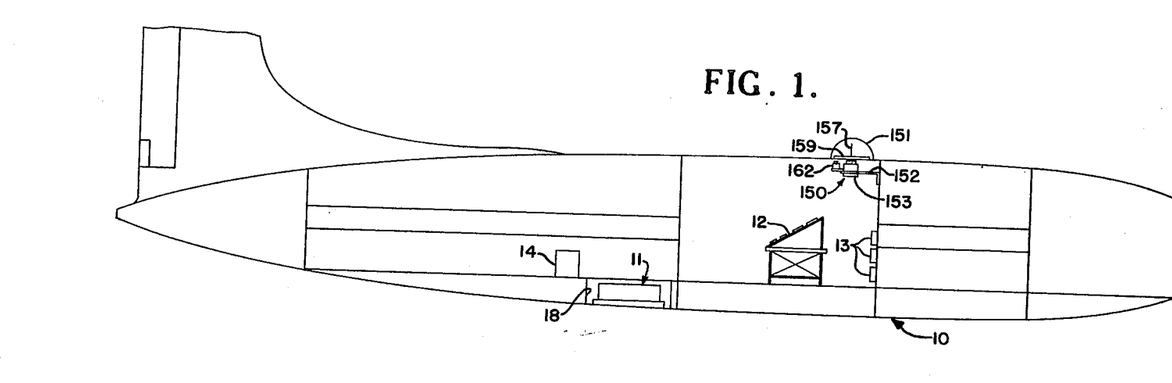
Fig. 1 illustrates generally and in diagrammatic form the apparatus employed in the present invention and mounted in an aircraft.

The magnetometer assembly 11 generally follows the construction of that disclosed in the aforementioned Patent No. 2,427,014 issued to W. J. Means for Orienting Device, and is provided with a rectangular nonmagnetic frame 15. Frame 15 is supported by and secured to a base member 16 which is, in turn, supported by shock absorbing mounts 17 in a recess 18 formed in the lower portion of the fuselage of aircraft 10. The position of recess 18 within the aircraft 10 is such that a compromise between closeness thereof to the center of motion of the aircraft and the greatest possible distance thereof from the sources of magnetic disturbance such, for example as the engines, is effected. It is also desirable to locate all apparatus in the aircraft which produces a strong magnetic field in such a manner as to have the least possible effect on the magnetometer 11.

As indicated in Fig. 1, a position slightly aft of amidship has been found most desirable in the present installation. It is, of course, understood that the most favorable position for the magnetometer will vary in different types of aircraft.

Figure 2:
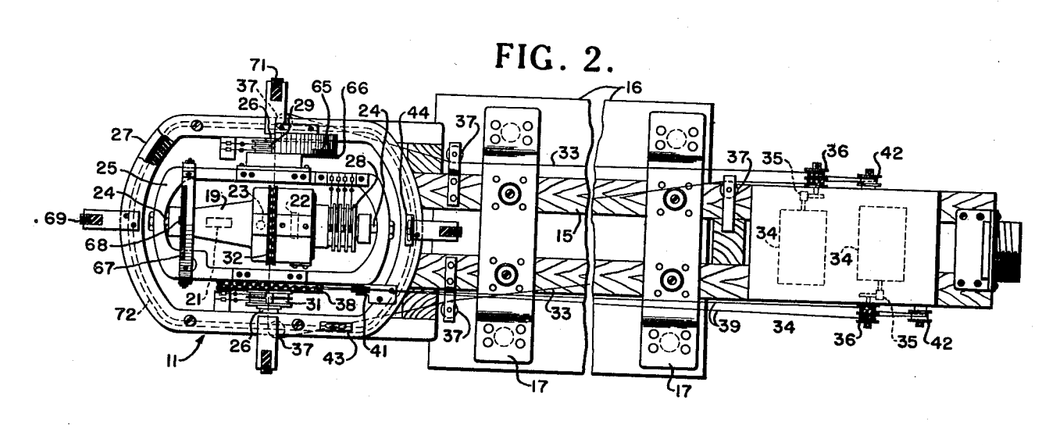
Fig. 2 is a top plan of the magnetometer apparatus employed in the present invention.

A housing 19 is provided for three mutually perpendicular magnetometer elements 21, 22, and 23. Element 21 is an axial magnetometer; 22 is a transverse magnetometer, and 23 is the detector magnetometer. The detector magnetometer 23 constitutes the physical element to be oriented in the magnetic field to be measured. The magnetometer elements 21, 22 and 23 are each excited by voltages of fundamental frequency from an A. C. source, axial magnetometer element 21 and transverse magnetometer element 22, which form a part of the orienting system for element 23, being arranged in such manner that when they form an angle other than 90° with respect to the direction of the magnetic field to be measured, there is induced therein a second harmonic voltage of magnitude and phase depending upon the magnitude and direction of angular displacement.

The detector element 23 as well as elements 21 and 22 of the magnetometer are saturable inductors, each comprising a coil of several thousand turns of fine wire and a core constructed of a thin strip of highly permeable metallic alloy rolled in scroll form. Each coil is excited by the application of a 1000 cycle A. C. current of sufficient amplitude to drive the core thereof into saturation on the positive and negative peaks of each cycle. The rise and fall of the flux in the core produced by the excitation current induces a voltage in the coil which is proportional to the rate of change of the flux in the core. When no external magnetic field is applied along the axis of the core other than the field produced by the excitation current, the wave form of the induced voltage will contain only odd order harmonics, i. e., 1000, 3000, 5000 cycles, etc. When the core is magnetized by a weak field such, for example, as a component of the earth's magnetic field, this bias will shift the operating point of the 1000 cycle current and cause it to saturate the core for a greater length of time on one peak of its cycle than on the other. As a result, the wave form of the induced voltage produced by the rise and fall of the flux in the core will become asymmetrical. This asymmetrical wave form, therefore, will contain even order harmonics, i. e., 2000, 4000, 6000 cycles, etc. which over a sufficiently useable range of magnetic field values will be proportional to the magnetic field along the axis of the core. The 2000 cycle harmonic which is isolated by means of an accurate 2 kc. band pass filter is employed for measurement purposes.

Figure 3:
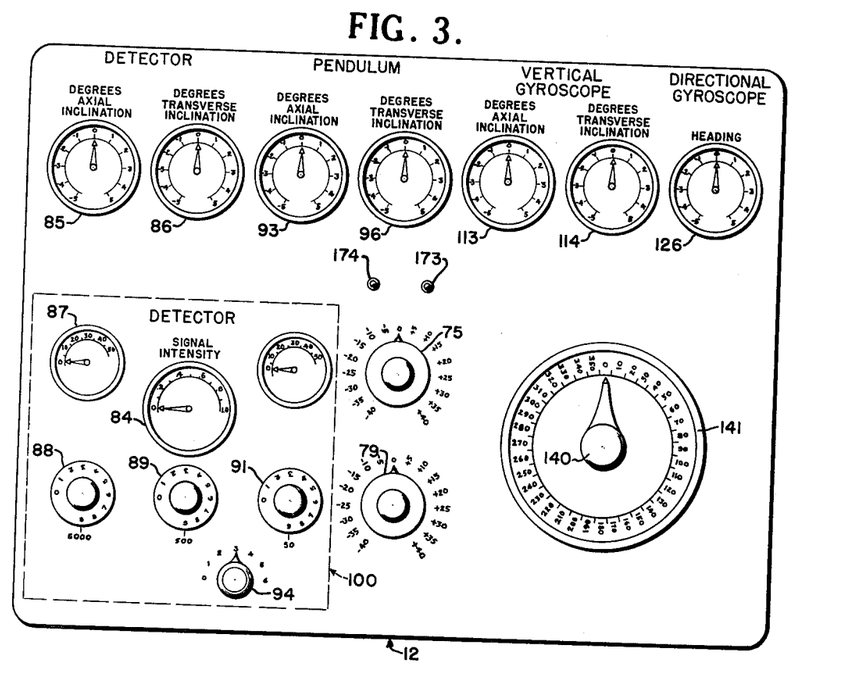
Fig. 3 is a face view of the control panel.
Figure 8:
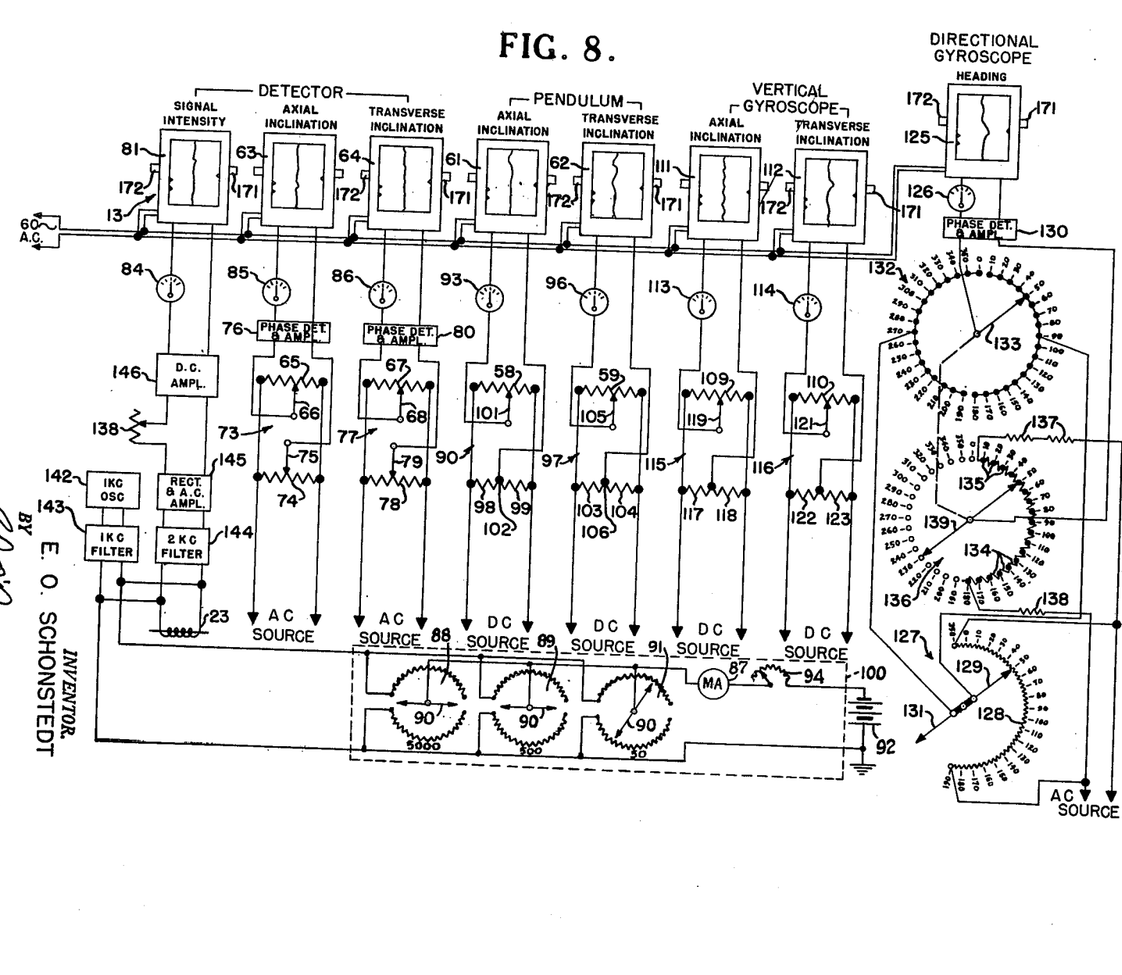
Fig. 8 is a schematic diagram of the electrical circuits of the present invention.

Since the earth's magnetic field ranges from about 25,000 gammas to 70,000 gammas (one gamma equals 1/100,000 oersted) small variations of the earth's magnetic field cannot be measured simply by means of an electrical meter. Therefore, a very accurately measured direct current is passed through the detector coil for nulling out the greater portion of the earth's magnetic field therein. This current is regulated by means of control box 100 with which the nulling current may be varied by means of switches 88, 89, 91 in increments corresponding to 5000, 500 and 50 gammas change of magnetic field respectively. Since the earth's magnetic field intensity does not go below about 25,000 gammas, the control box provides for changing the nulling field from a base value of 22,000 gammas to 72,000 gammas. Variations in total field intensity about a given control box setting are recorded on meters 81 and 84. The total magnetic field intensity measurement then consists of the base value, the control box setting and the variation recorded on meter 81 or 84. For example, if dial 88 were set on 7 to null 35,000 gammas, dial 89 on 4 to null 2000 gammas, dial 91 on 6 to null 300 gammas, and 85 gammas read on meter 81 or 84, the control box base value being 22,000 gammas, the total intensity would be the sum of these values or a total of 59,385 gammas.

Variable resistor 138 connected in series with meters 81 and 84 is adjustable in steps which provide for full scale readings of the meters of 50, 100, 200, 500, 1000 and 5000 gammas.

The housing 19 is formed of a solid piece of suitable plastic material and is provided at the ends thereof with pivot bearings for receiving the pivots 24 mounted in inner gimbal ring 25, which is supported by pivot bearings for receiving pivots 26 mounted in outer gimbal ring 27 and arranged at 90° from pivots 24. The outer gimbal ring 27 is fixedly secured to frame 15. It is understood that in order to provide for electrical connections between the magnetometer elements 21, 22 and 23 and frame 15, slip ring assemblies 28, 29 and 31 are employed, slip ring assembly 28, comprising four rings, being arranged for electrical conduction between housing 19 and inner gimbal ring 25, while slip ring assemblies 29 and 31, comprising two rings each, are arranged for electrical conduction between inner gimbal ring 25 and outer gimbal ring 27.

A pulley 32 is formed on housing 19 intermediate the ends thereof and at right angles to the axis through the pivots 24. An endless cord 33 has a portion thereof looped about pulley 32 and passes over suitable pulleys 37 to align it with the axis of pivots 26 each of which have bores formed therethrough, the cord passing through the bores to the exterior of the outer gimbal ring 27.

Mounted adjacent the end of frame 15 opposite to that occupied by the magnetometer housing 19, is a pair of two-phase electric motors 34, each motor having a reduction gearing 35 associated therewith, each of the driven shafts thereof having a double drive pulley 36 thereon. The cord or belt 33 passes over suitable pulleys 37 mounted on frame 15 to direct it toward the drive pulley 36 of a first motor 34.

A pulley 38 is fastened to inner gimbal ring 25. Endless cord 39 has a portion thereof looped about pulley 38 and passes over suitable pulley 41 to the drive pulley 36 of the second motor 34. Each of the drive pulleys 36 has associated therewith a yieldable belt tightening apparatus 42 to ensure adequate tension on cords 33 and 39 for an accurate slip-proof drive.

Axial and transverse spirit levels 43 and 44, respectively, are mounted on the outer or fixed gimbal ring 27 to establish true level of the frame with respect to the aircraft.

Figure 4:
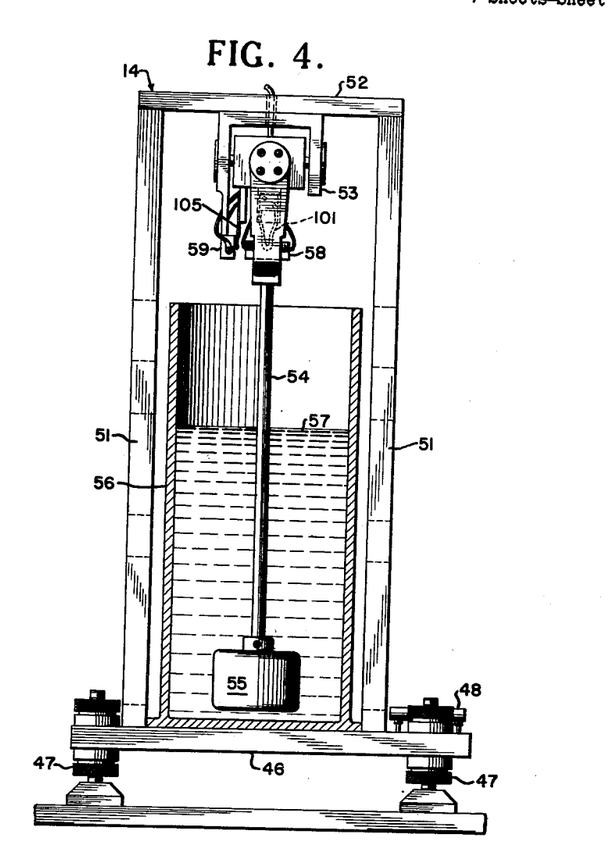
Fig. 4 is a side elevation of the pendulum apparatus of the present invention and showing the vessel in section.
Figure 5:
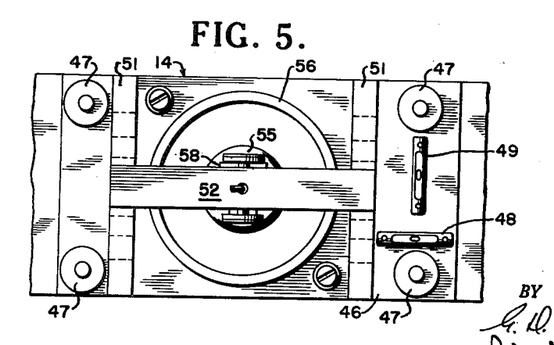
Fig. 5 is a top plan view of the pendulum apparatus.

The oil-damped pendulum indicated generally at 14 may be mounted on the floor of aircraft 10 or other convenient location. The pendulum assembly comprises a base 46, adjustably and vibration absorbingly mounted in aircraft 10 as at 47 and having mounted thereon a pair of spirit levels 48 and 49, the level 48 being axially mounted with respect to the aircraft and level 49 being mounted transversely thereto. A pair of spaced vertical frame members 51 are mounted on base 46 and extend vertically therefrom. A cross member 52 is mounted on the upper extremities of members 51 and forms a support for the gimbals or universal joint assembly generally indicated at 53. Depending from the joint 53 by means of rod 54 is an inertia member 55. A vessel in the form of a cylinder 56 is mounted on base 46 between frame members 51. The inertia member 55 depends into cylinder 56 to a point adjacent the bottom thereof. Silicone oil 57 of suitable viscosity is placed in cylinder 56 to damp the movement of inertia member 55. Potentiometers 58 and 59 are mounted on gimbals assembly 53 in such a manner that movement is produced between the resistor element and the contact arms of the potentiometers as movement of the inertia member 55 occurs in a direction longitudinally of the aircraft to indicate pitch in the case of potentiometer 58 and in a transverse direction to indicate roll in the case of potentiometer 59.

A reading of the variations of current passing through potentiometers 58 and 59 as the inertia member moves in response to tilting of the aircraft is presented in tape form by a pair of recording oscillographs, as will be hereinafter more fully described.

The spirit levels 48 and 49 are employed as a reference in conjunction with levels 43 and 44 in order to bring the base 46 into perfect parallelism with the frame 15 and the magnetometer assembly 11 by adjustment of the mounting arrangement 47.

In the use of the present invention, the mounting for the magnetometer 11 and the pendulum 14 being parallel to the longitudinal axis of aircraft 10, angular motion of the airplane in two mutually perpendicular directions is recorded on the recording oscillographs or milliammeters 61 and 62 actuated by variations of current in the control circuits therefor caused by changes in resistance of the potentiometers 58 and 59 as they are moved by action of the pendulum member 55. It will, thus, be apparent that the angular positions of the aircraft and the apparatus secured to and contained therein may be recorded throughout the flight of the airplane.

It is also to be noted that the positions assumed by the detector coil assembly of the magnetometer during the flight will be recorded on recording oscillographs or milliammeters 63 and 64, which are actuated by variations of current in the control circuits individual thereto.

The control circuit for recording milliammeter 63 and milliammeter 85, which records the axial inclinations of the detector coil 23, comprises a bridge circuit 73 having the resistor of potentiometer 65 across an A. C. source. There is also provided a resistor 74 across the A. C. source, a variable contact arm 66 being associated with the resistor of potentiometer 65 and manual control arm 75 being associated with resistor 74 on control panel 12. Leads from arms 66 and 75 are connected to the input of a phase detector and amplifier 76 while the meters 63 and 85 are connected to the output thereof.

Figures 10, 11, 14:
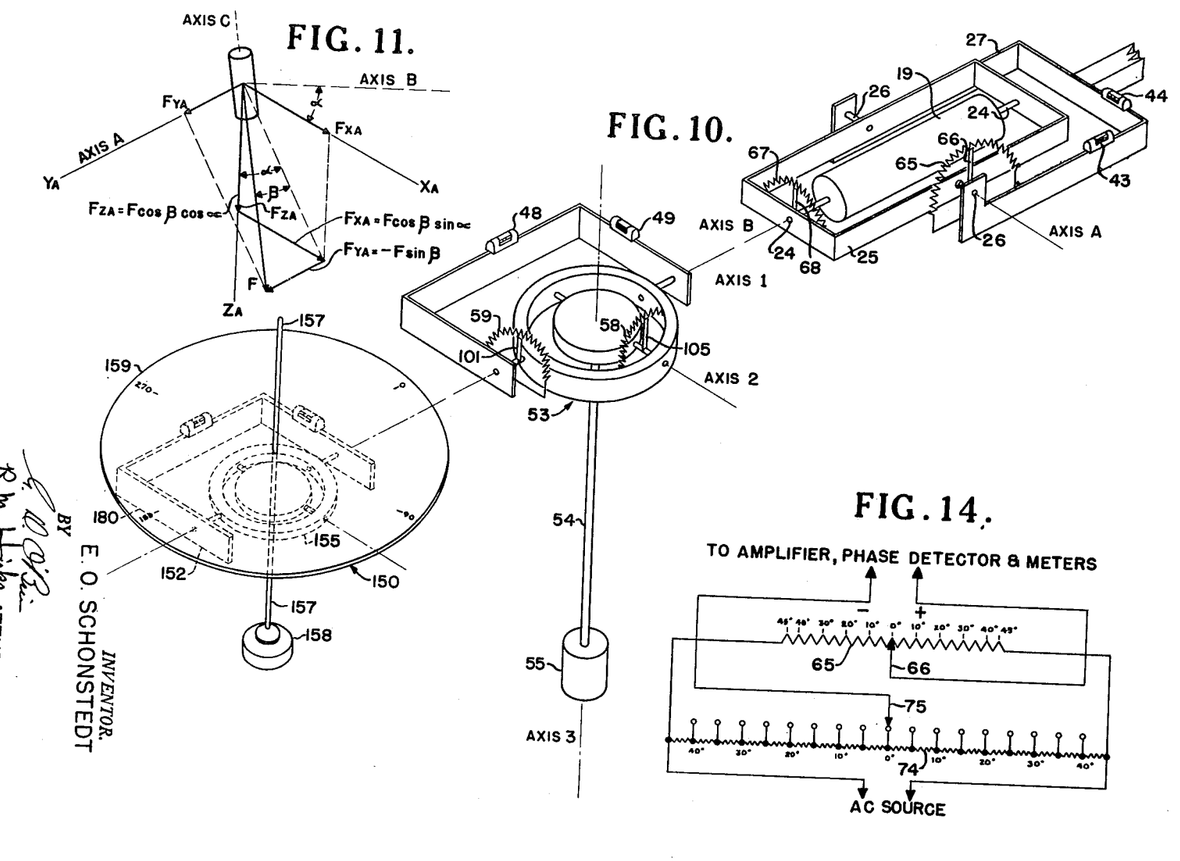
Fig. 10 is a diagram of the pendulum mechanism and showing the orientation thereof with respect to the magnetometer assembly.
Figs. 11, 12, 13 are diagrams showing the projection of various components of the earth's total field vector with respect to the three coordinate systems employed in the present invention.
Fig. 14 is a diagram illustrating in greater detail one of the bridge circuits for use in the recording system for indicating angular deviations of the detector coil.

While the resistors 74 and 78 have been shown in Fig. 8 as being single resistors because of space limitations, these resistors are shown in greater detail in Fig. 14. It is apparent from Fig. 14 that the potentiometer 65 which is similar to 67 comprises a continuous resistor having a spread of 90°, 45° plus and minus of 0°. Potentiometer 74 which is similar to 78 comprises a plurality of resistors in increments of 5° and has a 90° spread, 45° plus and minus of 0°.

The circuit for recording milliammeter 64 and milliammeter 86 is similar to that employed for meters 63 and 85, there being provided a bridge circuit 77 having the resistor of potentiometer 67, across an A. C. source. Potentiometer 67 is provided with contact arm 68. Resistor 78 is, also, across the A. C. source and is provided with a variable contact arm 79. Leads from contact arm 68 and arm 79 enter the input of phase detector and amplifier 80, meters 64 and 86 being connected in the output circuit of 80.

It is, of course, understood that potentiometer 65 is mounted on outer gimbal ring 27 and contact arm 66 is mounted on the inner gimbal ring 25 whereby axial movement of the detector coil 23 will cause relative motion therebetween. The potentiometer 67 is mounted on the inner gimbal ring 25 and its contact arm 68 is mounted on housing 19 whereby transverse angular motion of the detector coil 23 causes relative motion therebetween.

In order to compensate for the magnetic field of the aircraft, and to prevent disturbance of the magnetic detector circuit thereby, three mutually perpendicular compensating coils 69, 71 and 72, Fig. 2, are provided, the coil 69 being aligned along the axis of housing 19, the coil 71 being aligned transversely thereof, and coil 72 being wound around the outer gimbal ring 27. When suitable voltage is applied to the aforementioned coils it is clear that the effects of the permanent type magnetic field of the aircraft and magnetic equipment contained therein may be effectively nullified.

Milliammeters 84, 85, and 86 associated respectively with recording milliammeters 81, 63, and 64, are mounted on the control panel 12 in order to be in view of an operator. Step resistors 88, 89, and 91 of the nulling control box 100 for the detector are also mounted on control panel 12 and are arranged in the circuit of detector coil 23. Variable resistors 88, 89, and 91 are provided with a series of contacts for changing the nulling field in the detector in increments of 5000, 500, and 50 gammas respectively. Each of the resistors has a pair of banks of step resistors, one bank of resistors being connected in series through a selector arm 90 with battery 92 and one end thereof being connected to detector coil 23, while the other bank of resistors is connected to ground at one end and to battery 92 through the selector arm 90. As more resistance is applied to the detector coil circuit by adjusting resistors 88, 89, 91, less resistance is connected to ground or vice versa. In this manner drain on battery 92 is substantially the same regardless of the amount of resistance connected to the detector coil in the field biasing circuit therefor. The purpose of applying this nulling current to the detector coil, as aforementioned, is to substantially nullify the effects of the normal earth's magnetic field on the circuit thus the total field strength is read above a known base value by combining the readings of resistors 88, 89, and 91 and those of meter 81 or 84. This field biasing circuit arrangement is generally similar to that disclosed in the copending application of E. P. Felch, Jr. et al. for Detection System, Serial No. 618,550, filed September 25, 1945.

A milliammeter 87 and variable resistor 94 are arranged in the aforementioned circuit in order to provide for the accurate adjustment of the output of battery 92. In the diagram of Fig. 8 the foregoing apparatus is enclosed in the box 100. The foregoing apparatus 100 is connected in parallel with the detector coil 23 and a one kilocycle A. C. oscillator 142 having a one kilocycle filter 143 associated therewith. As aforesaid, the coil 23 is excited by the 1000 cycle A. C. current, supplied by the oscillator 142, to drive the core of the coil into saturation at the positive and negative peaks of each cycle which induces a second harmonic signal voltage in the coil. This signal voltage passes through a 2 kilocycle filter 144, A. C. amplifier and rectifier 145, D. C. amplifier 146, to meters 84 and 81 thus producing a reading on the meters as has heretofore been described. The schematic diagram of an electrical circuit for the recording milliammeters 61 and 62 associated with pendulum 14 for indicating pitch and roll, respectively, of the aircraft is, also, illustrated in Fig. 8. Mounted in series with recording milliammeter 61 is a milliammeter 93, while milliammeter 96 is mounted in series with recording milliammeter 62. A bridge circuit 90 is arranged in the circuit of recording meter 61, while bridge circuit 97 is arranged in the circuit of meter 62. Potentiometer 58, which is mounted on the pendulum gimbal 53 to indicate pitch, comprises two arms of the bridge 90, the other arms comprising resistors 98 and 99. When the aircraft is horizontal with respect to the earth, rod 54 is vertical and contact arm 101 of potentiometer 58, which is connected in series with meters 61 and 93, is in the mid position of the resistance element thereof, the ends of the resistor being respectively connected to a D. C. source. There is provided a fixed connection 102 to meters 61 and 93 between resistors 98 and 99, the outer ends of the resistors also being connected to the D. C. source. In this position of contact arm 101, the circuit for meters 61 and 93 is balanced and the meters read zero. As the aircraft changes angle from the horizontal along the axis thereof the contact arm 101 moves from the mid position thus causing an unbalance in the bridge 90 which, in turn, causes the meters to move from their zero positions a distance proportional to the movement of contact arm 101 and in a direction depending upon the polarity of the unbalance, the bridge, as aforementioned, being connected to a source of direct current.

The bridge circuit 97 is similar to bridge circuit 90, comprising the potentiometer 59, which is mounted on gimbal 53 to indicate roll, forming two arms of bridge 97, the other arms comprising resistors 103 and 104. Potentiometer 59 is provided with a movable contact arm 105 which contacts the resistor of the potentiometer at the mid point thereof when the rod 54 is vertical and the aircraft is horizontal. There is, also, a fixed connection 106 between the resistors 103 and 104. The ends of resistor of potentiometer 59 and the outer ends of resistors 103 and 104 are connected to a source of direct current, while the arm 105 and the fixed connection 106 are respectively connected to the two sides of the circuit of meters 62 and 96. It is apparent that the operation is similar to that of the circuit controlling meters 61 and 93 as heretofore described, the unbalance caused by movement of arm 105, in turn, causing the meters to indicate the degree of roll of the aircraft. The pendulum 45 has a limited movement of 5° in any direction from the zero position therefore it is not necessary to provide variable resistors as in the foregoing bridge circuits 73 and 77.

An aircraft in flight has a tendency to develop oscillations which vary from true horizontal flight there being short alternate periods of climbing and descending along the path of travel of the aircraft, such oscillations being called phugoid oscillations. In employing the pendulum of the present invention the effects of such oscillations are substantially reduced by averaging two cycles of the oscillations. There are, also, present during flight of the aircraft transverse oscillations, each of much shorter duration than the foregoing oscillations of the longitudinal axis, these shorter oscillations are, also, averaged for a period of time equal to the foregoing two cycles, it being understood that due to the shorter period of each oscillation there are many more cycles present and the magnitude of error in reading is very small.

The action of the pendulum during the phugoid oscillations is as follows:

As the aircraft climbs, there is a corresponding loss of forward speed which causes the pendulum through inertial force to move forward thereby tending to counteract the effect of change of angle of the aircraft on the pendulum. As the aircraft descends, there is a corresponding increase of forward speed which causes the pendulum through inertial force to move to the rear thus tending to counteract the effect of this form of change of angle of the aircraft on the pendulum. It will, thus, be seen that during such oscillations of the aircraft the reading of meters 61, 62, 93 and 96 will be somewhat inaccurate, such inaccuracy being substantially nullified by the aforementioned averaging of two cycles of such oscillations.

Figure 6:
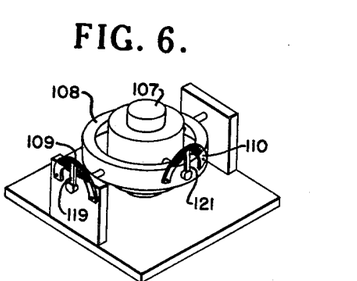
Fig. 6 is a schematic perspective view of the vertical gyroscope.

During acceleration or deceleration of the aircraft, the readings produced by the pendulum 14 will also not be entirely accurate, therefore a vertical gyroscope 107, Fig. 6, is provided having a measurable tilt of 5° in any direction from vertical and mounted in a gimbal 108 which is provided with potentiometers 109 and 110 which will indidate pitch and roll, respectively, of the aircraft. This gyro determines the period of the phugoid oscillation for obtaining accurately the periods over which the data are averaged.

As illustrated in Fig. 8, the circuits provided for recording milliammeters 111 and 112 and milliammeters 113 and 114 associated with gyroscope 107 are arranged in the same manner as the circuits for meters 61, 62, 93, and 96. A bridge circuit 115 is provided for meters 111 and 113, while bridge circuit 116 is provided for meters 112 and 114. Potentiometer 109 of bridge 115 is connected at its ends, as are the outer ends of resistors 117, 118, to a source of direct current, while a variable contact arm 119 associated with the winding of potentiometer 109 is connected to the gimbal mounting 108 in such a manner as to indicate pitch of the aircraft by causing an unbalance in the bridge circuit 115 when the longitudinal axis of the aircraft moves angularly with respect to the horizontal, the arm 119 being connected to one side of the meter circuit, while the inner ends of resistors 117, 118 are connected to the other side thereof.

The potentiometer 110 is connected in bridge circuit 116 of meters 112 and 114 and has a variable contact arm 121 connected to one side of the meter circuit, while the outer ends of the resistor of potentiometer 110 are connected to a source of direct current. Resistors 122, 123 have their outer ends connected to the source of direct current, while the inner ends thereof are connected to the other side of the meter circuit. The arm 121 is connected to the gimbal mechanism 108 in such a manner as to cause an unbalance in the bridge circuit 116 to indicate roll when the aircraft varies angularly from the horizontal in a direction at right angles from the longitudinal axis of the aircraft. The vertical gyroscope 107 is mounted with the outer gimbal axis thereof in parallelism with the longitudinal axis of the aircraft.

In order to make astral readings indicative of true heading and geographic location in connection with the present invention, there is provided a sun compass or relative bearing indicator disclosed in my copending application for Sun Compass, Serial No. 214,619, filed March 8, 1951, now Patent No. 2,612,693, and indicated generally at 150. As indicated in Fig. 1, the sun compass 150 is mounted in the astral dome 151 of aircraft 10.

Figures 9, 15:
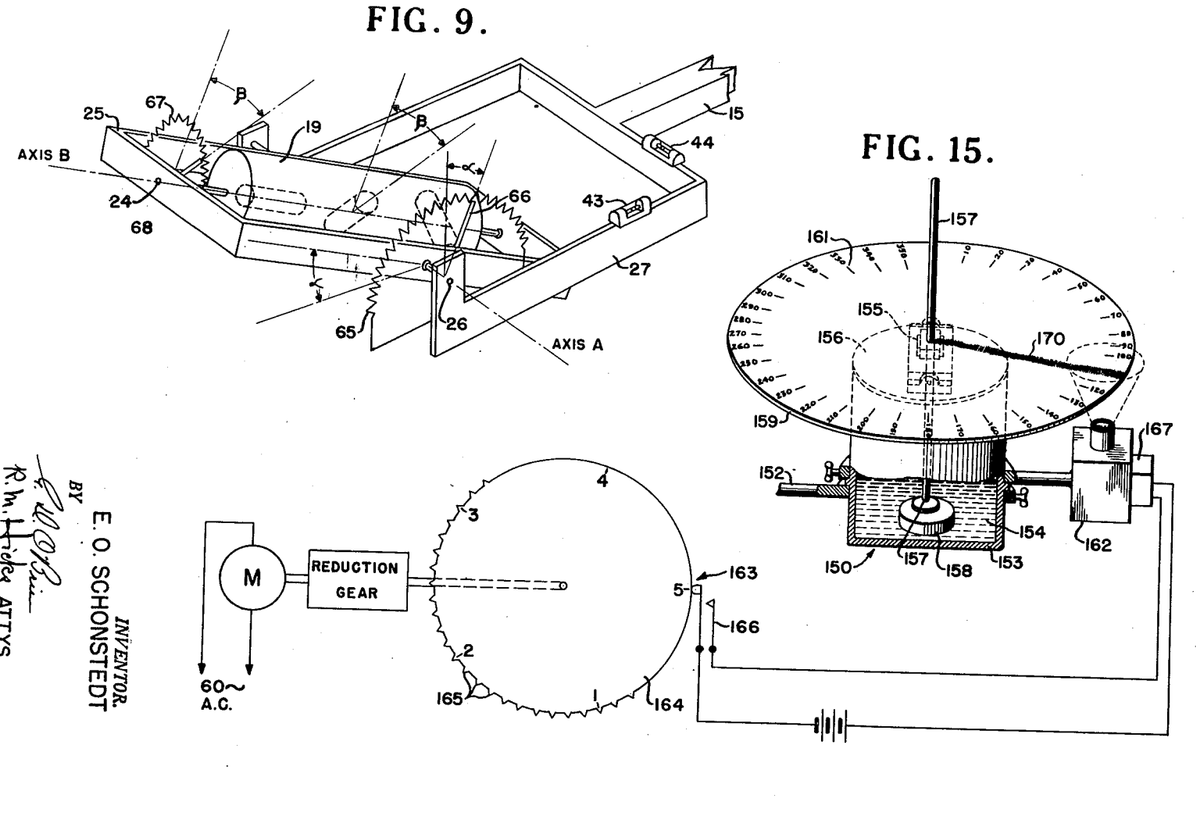
Fig. 9 is a schematic perspective of the magnetometer assembly.
Fig. 15 is a schematic diagram of the photographically recording sun compass employed with the present invention and showing the means for operating the recording mechanism therefor.

As illustrated more clearly in Fig. 15, the compass 150 comprises an adjustable structure 152 for rotatably supporting a vessel 153 containing oil 154, a gimbal 155 mounted on cover 156 of vessel 153, a shaft or rod 157 extending into vessel 153 and supported by the inner ring of gimbal 155. The rod 157 has mounted on the lower end thereof a mass 158 which is normally immersed in oil 154 and motion of the mass is damped thereby. Rod 157 has a vertical extension projecting a distance beyond gimbal 155.

That portion of gimbal 155 which supports rod 157 also supports a horizontal disk 159 formed of a transparent material and having a semi-transparent covering and a scale 161 at the periphery thereof, the scale being marked in degrees of azimuth. In operation, the shadow of the projecting extension of rod 157 falls across scale 161, thus providing a reading of variations of heading and geographic position of the aircraft with respect to the sun.

A record of the aforementioned variations in heading is made by photographing at regular intervals the shadow of the rod 157 as it appears on scale 161 of disk 159. A camera 162 mounted for rotary adjustment about the vessel 153 is provided for producing such photographic record. The camera 162 may be of a well-known variety suitable for the purpose and is provided with a means for timing the intervals between exposures such, for example, as the cam and switch arrangement indicated generally at 163.

The cam 164 of this timing means makes one revolution in five minutes and has a plurality of raised cam surfaces 165 to close switch 166 whereby operating mechanism 167 is energized to expose the film contained in the camera and move it to the succeeding position every 6 seconds for a period of approximately two minutes of each five minutes of operation which provides an inactive period of approximately three minutes between each two minute period. Preferably the cam 164 is provided with two or more additional cam surfaces 165 at each end of the two minute period to permit adjustment of the two minute time period where desired.

The cam 164 is driven by a synchronous motor in the power circuit for driving the recorders 13 and having reduction gearing to reduce the speed sufficiently to produce the aforementioned result.

Figure 7:
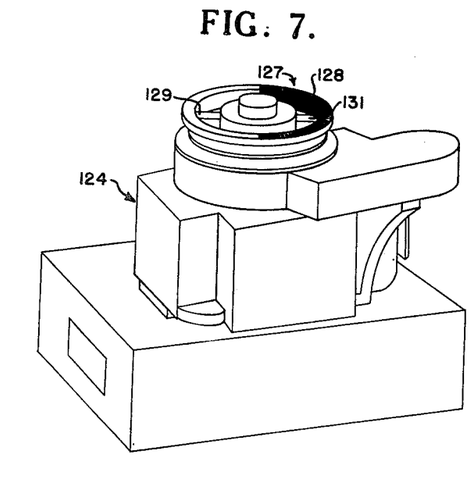
Fig. 7 is a schematic perspective view of the directional gyroscope.

Pendulum stability is affected during turns of the aircraft, and for this reason a directional gyroscope 124, Fig. 7, is provided to determine when such turns occur which will adversely affect the accuracy of the angle measurements of the pendulum and sun compass. Gyroscope 124 has associated therewith recording milliammeter 125 and milliammeter 126, Fig. 8. A potentiometer 127 is provided with a resistor element 128 which has a 200 degree spread and a pair of separate contact arms 129, 131 spaced 180 degrees apart. The ends of resistor element 128 are connected to a source of alternating current. A circular array of contacts 132 are arranged at 10° intervals from 0° to 350°, the contacts from 10° to 180° being interconnected and connected to arm 129 of potentiometer 127. The contacts from 190° to 0° are interconnected and contact arm 131 of potentiometer 127 is connected thereto. A contact arm 133 engages individually the contact 132 as it is rotated and is connected to one side of the phase detector and amplifier 130.

A plurality of step resistors 134 are arranged between contacts 135 of variable resistor 136. Contacts 135 are spaced 10 degrees apart from 10° through 180°. A pair of resistors 137 are connected between the 10° contact and one side of a source of alternating current. A single resistor 138 is connected between the contact at 180° and the other side of the A. C. source.

The resistors 134 are arranged in approximately half of a complete circle and a pair of contact arms 139 spaced 180° apart are provided in order to effect the functional equivalent of a complete ring of resistors and thus avoid placing an excessive amount of resistance in the circuit.

The resistors 128 and 134 comprise arms of a bridge circuit similar to the foregoing bridge circuits 73 and 77. As will be apparent, if 0° is the true heading and the aircraft is 3° to the left of the true heading, it being assumed that arms 133 and 139 are at the 0° setting, the resistor 138 is in one side of the circuit, while the portion of resistor 128 between 177° and 190° is effective to cause an overbalance of resistance the equivalent of 3°, thus there will be a deflection of the needles of meters 125 and 126 the equivalent of 3°.

The meters 125 and 126 have a deflection value of plus or minus 5° and in order to keep the needles thereof within this 10° limit the resistors 134 are provided. As the contact arms 129, 131 move beyond the first 5° (plus or minus) from the 0° position of resistor 128, the interconnected contact arms 133, 139 are moved by a single control knob 140, associated with dial 141 to the 10° setting, in case of a plus 5° reading of the meters, or to the 350° setting, in case of a minus 5° reading. It will thus be apparent that the bridge circuit is balanced within 10° by moving the contact arms 139, 133 to the nearest 10°, the difference being readable on the meters 125, 126. As the directional gyroscope has a full 360° turn, the arms 129 and 131 being moved in unison therewith and as resistance 128 is only provided between 350° through 0° to 190° reading in a clockwise direction, the bank of contacts 132 with contact arm 133 are provided to shift the circuit from arm 129 to arm 131 or vice versa as one or the other arm moves off the resistor 128.

The direct current meters 125, 126 are actuated by passing the output current of the bridge circuit comprising resistors 127 and 136 through the phase detector and amplifier 130.

The recording tape of meter 125, as are the tapes of all of the recording milliammeters 13 and the camera for sun compass 150 are driven by synchronous motors connected to a common source of accurately cycled alternating current. In order to synchronously mark the edges of the tapes of recording milliammeters 13 with indications of time or other indicia, each of the recorders is provided with right and left edge markers 171 and 172, respectively. These edge markers are operated electrically by suitable right and left circuits (not shown), the circuits being closed by pushbutton switches 173 and 174, respectively, mounted on control panel 12.

The process by which the direction of the total magnetic field vector is determined with respect to geographic coordinates is carried out in the following three steps:

(a) The direction of the earth's total magnetic field vector is determined with respect to a rectangular coordinate system which is fixed with respect to the aircraft and including the longitudinal axis or centerline thereof as one of the coordinates.

(b) The attitude of the aircraft is determined with respect to a second rectangular coordinate system including the horizontal component of the aircraft centerline and true vertical.

(c) The attitude of the aircraft is determined with respect to a third rectangular coordinate system including true north.

The result under (a) as aforementioned is accomplished by measuring the angular rotation of the detector coil about the two axes of the gimbal in which it is mounted. These angles are measured by means of bridge circuits 73 and 77 which include the potentiometers 65 and 67, respectively, mounted on the gimbal axes as shown in Figs. 2 and 9. As shown in Fig. 9, the gimbal ring 25 rotates on axis A and the angle of rotation about this axis is designated $\alpha$. Housing 19 rotates on axis B and the angle of rotation about this axis is designated $\beta$. Angles $\alpha$ and $\beta$ are considered to be at zero when axes A and B lie in a horizontal plane established by levels 43 and 44 mounted on ring 27 which is fixed to frame 15 and when the axis C of the detector coil 23 coincides with the axis designated $Z_A$ which is perpendicular to this plane. Axes $Y_A$, $X_A$, and $Z_A$ constitute the first of the aforementioned rectangular coordinate systems which is rigid with respect to the aircraft and which coincides with the axes A, B and C when $\alpha$ and $\beta$ equal zero.

In mounting mechanism 11 in aircraft 10, the axis A is arranged horizontal and perpendicular to the centerline of the aircraft. Under such condition the components of the earth's magnetic field with respect to the aforementioned aircraft coordinate system will be as indicated in Fig. 11. $Z_A$, $X_A$ and $Y_A$ are, in this position, the vertical and horizontal coordinates taken with respect to the aircraft. The vertical component $F_{ZA}$ is taken positive downward to comply with the convention in which the vertical component in the northern hemisphere, which is directed downward, is considered positive.

It should be observed that the gimbal mounting of the housing 19 which contains the detector coil is such that the axis B pivots about axis A, the latter being fixed with respect to the aircraft. The angle $\alpha$ is the angle between $X_A$ and axis B, as shown in Fig. 11. The plane in which $\beta$ is measured is always perpendicular to axis B. The component $F_{XA}$ in the direction of flight will be $$F_{XA} = F \cos \beta \sin \alpha \qquad (1)$$

where F is the total magnetic field intensity and is parallel with the detector axis. The horizontal component $F_{YA}$, perpendicular to the direction of flight is $$F_{YA} = -F \sin \beta \qquad (2)$$

The vertical component $F_{ZA}$ is $$F_{ZA} = F \cos \beta \cos \alpha \qquad (3)$$

The present system is arranged to give the conventional positive polarity to the downwardly directed vertical component of the earth's magnetic field and to employ a conventional right hand coordinate system. It will be noted in Fig. 11 that the angle $\beta$ is developed clockwise about axis $X_A$ and is therefore considered negative by convention wherefore the component $F_{YA}$ is positive notwithstanding the negative sine in the equation therefor, the sine of $\beta$ being negative and F being positive.

The pendulum assembly 14, Figs. 4 and 10, is employed as aforesaid for determining true vertical, the potentiometers 58 and 59 reading zero when the two gimbal axes 1 and 2 are horizontal, the rod 54, axis 3, being vertical. The two levels 48 and 49 indicate when the pendulum is leveled with these axes horizontal. Although the pendulum may be mounted in several positions, for this analysis it is assumed that the pendulum is carried in the aircraft with the outer axis 1 of the gimbal 53 parallel with coordinate $X_A$. Axes 1 and $X_A$ will be substantially parallel with the center line of the aircraft. This axis is rigidly secured with respect to the outer frame of the pendulum and therefore pitches with the aircraft. The inner axis 2 of the gimbal is fixed with respect to the pendulum arm and thus is always horizontal assuming that the aircraft is under a condition of non-accelerated flight. While it is, of course, perpendicular to the centerline, it is parallel to $Y_A$ only when the latter is truly horizontal. The orientation of the detector and pendulum gimbals is shown in Fig. 10.

The pendulum assembly 14 establishes a coordinate system which has true vertical as one of its coordinates and the projection of the $X_A$ coordinate on a horizontal plane as another. The coordinate axes are labeled $X_E$, $Y_E$, and $Z_E$, Fig. 12. $X_E$ is the horizontal coordinate parallel to the aircraft heading, $Y_E$ is truly horizontal and perpendicular to the aircraft heading, and $Z_E$ is truly vertical. Axes 1, 2, and 3 will be parallel to $X_E$, $Y_E$, and $Z_E$, respectively when angles $p$ and $r$, which respectively designate the pitch and roll angle of the aircraft, are zero.

Figure 12:
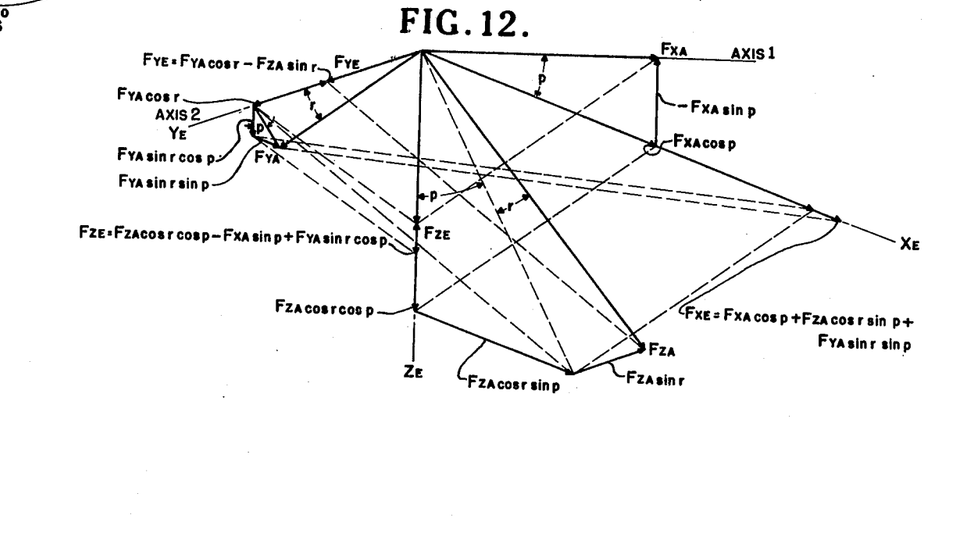

Let it be assumed that the aircraft has pitched through angle $p$ as shown in Fig. 12. In a pitch motion the outer axis of the gimbal pitches with the aircraft, the gimbal being fixed thereto. Since the coordinate $X_A$ is also fixed with respect to the aircraft it is coincident with axis 1 and moves with it. The amount of pitch motion is registered by reason of the rotation of rod 54 about the inner gimbal axis 2. Since the inertia member remains in a stationary attitude with respect to vertical, it may be stated that with respect to the earth the coordinates $X_A$ and $Z_A$ pivot about axis 2.

In Fig. 12 it is also assumed that the aircraft has undergone a roll motion through the angle $r$. This roll motion is registered by reason of the pivoting of the pendulum inertia member about axis 1. Since the inertia member remains in a stationary attitude with respect to vertical, it may be stated that with respect to the earth the coordinates $Y_A$ and $Z_A$ pivot about axis 1.

The components measured with respect to the pendulum vertical reference coordinate system are expressed mathematically as follows:

$$F_{XE} = F_{XA} \cos p + F_{YA} \sin r \sin p + F_{ZA} \cos r \sin p$$
$$= F(\sin \alpha \cos \beta \cos p - \sin \beta \sin r \sin p + \cos \alpha \cos \beta \cos r \sin p) \quad (4)$$

$$F_{YE} = F_{YA} \cos r - F_{ZA} \sin r$$
$$= F(-\sin \beta \cos r - \cos \alpha \cos \beta \sin r) \quad (5)$$

$$F_{ZE} = F_{ZA} \cos r \cos p - F_{XA} \sin p + F_{YA} \sin r \cos p$$
$$= F(\cos \alpha \cos \beta \cos r \cos p - \sin \alpha \cos \beta \sin p - \sin \beta \sin r \cos p) \quad (6)$$

For very precise results, angle $r$ is corrected for a deflection of the pendulum due to coriolis acceleration. The magnitude of this correction may be obtained from the tables of the Air Almanac. The corrected value of angle $r$ is employed in computing $F_{XE}$, $F_{YE}$ and $F_{ZE}$.

The final steps in establishing the direction of the magnetic field vector with respect to geographic coordinates including true north comprises determinations of true heading, and ground position. True heading is obtained by astral observations using the sun or a star, preferably the sun, as the reference. Ground position is obtained by a variety of means, depending on flight conditions, comprising contact flying, astral observations, loran fixes and other means suitable for the purpose.

As may best be seen in Fig. 10, the sun compass 150 is initially adjusted in a manner similar to the adjustment of the vertical pendulum assembly 14 so that the outer gimbal axis thereof is initially horizontal and parallel to the centerline of the aircraft and the inner gimbal axis is horizontal, the rod 157 being vertical. The scale disk 159 is also adjusted so that a line through 0° and 180° thereon is parallel with the centerline of the aircraft, the 0° being forward and the 180° being aft.

Figure 16:
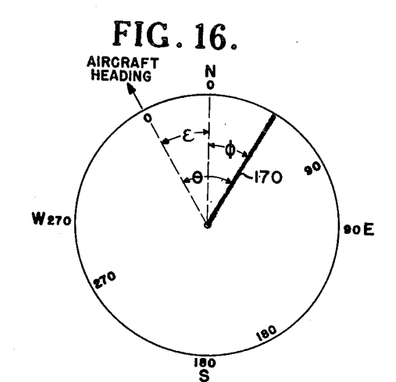
Fig. 16 is a diagram illustrating the relative bearing of the aircraft with respect to the sun and the aircraft heading with respect to true north.

By reason of this arrangement, the line 170, which in the diagram of Fig. 16 represents the shadow of rod 157 of the sun compass, makes an angle $\theta$ with respect to the heading of the aircraft. If the heading of the aircraft were true north, line 170 would make an angle $\phi$ with respect to the aircraft heading. The true heading (T. H.) of the aircraft, therefore, is given by the angle $\epsilon$ where $$\epsilon = \phi - \theta \quad (7)$$

Angle $\phi$ may be determined by means of a computer such, for example, as the azimuth computer disclosed in Patent No. 2,408,776 issued to Joseph Hilsenrath and Samuel Globe, the sun time and latitude being known. Angle $\theta$, of course, is the relative bearing of the aircraft with respect to the sun and is obtained from average readings along time spaced intervals of the photographic record, as aforedescribed.

Figure 13:
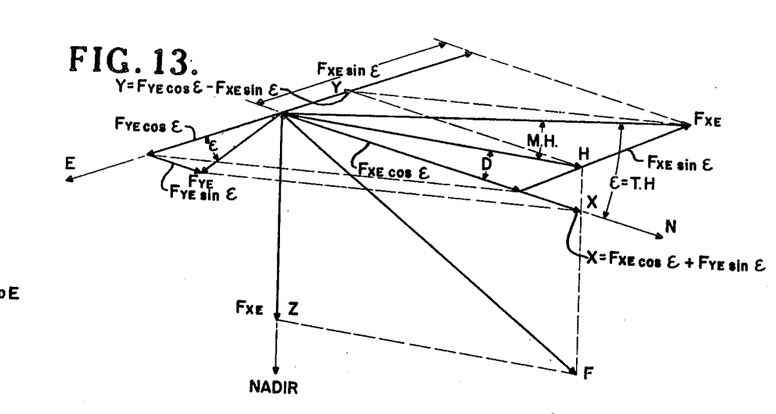

Angle $\epsilon$ is utilized in setting up the third rectangular coordinate system of the present invention as disclosed in Fig. 13 wherein the coordinates comprise north, east and true vertical or nadir.

In the coordinate system of Fig. 13, components $F_{XE}$ and $F_{YE}$ are displaced from the north and east coordinates by the angle $\epsilon$. Under these conditions the field components X and Y along the north and east coordinates are expressed by the equations:

$$X = F_{XE} \cos \epsilon - F_{YE} \sin \epsilon \quad (8)$$
$$= F(\sin \alpha \cos \beta \cos p \cos \epsilon - \sin \beta \sin r \sin p \cos \epsilon + \cos \alpha \cos \beta \cos r \sin p \cos \epsilon + \sin \beta \cos r \sin \epsilon + \cos \alpha \cos \beta \sin r \sin \epsilon)$$

$$Y = F_{YE} \cos \epsilon + F_{XE} \sin \epsilon \quad (9)$$
$$= F(-\sin \beta \cos r \cos \epsilon - \cos \alpha \cos \beta \sin r \cos \epsilon + \sin \alpha \cos \beta \cos p \sin \epsilon - \sin \beta \sin r \sin p \sin \epsilon + \cos \alpha \cos \beta \cos r \sin p \sin \epsilon)$$

The declination angle D is expressed by the equation:

$$D = \tan^{-1} \frac{Y}{X} \quad (10)$$

$$= \tan^{-1} \left[ \frac{\begin{pmatrix} -\sin \beta \cos r \cos \epsilon - \cos \alpha \cos \beta \sin r \cos \epsilon + \\ \sin \alpha \cos \beta \cos p \sin \epsilon - \sin \beta \sin r \sin p \sin \epsilon + \\ \cos \alpha \cos \beta \cos r \sin p \sin \epsilon \end{pmatrix}}{\begin{pmatrix} \sin \alpha \cos \beta \cos p \cos \epsilon - \sin \beta \sin r \sin p \cos \epsilon + \\ \cos \alpha \cos \beta \cos r \sin p \cos \epsilon + \sin \beta \cos r \sin \epsilon + \\ \cos \alpha \cos \beta \sin r \sin \epsilon \end{pmatrix}} \right]$$

Declination is defined as the angle between true north and the direction of the horizontal component of the earth's magnetic field. Therefore, if the direction of the horizontal component lies in a clockwise direction from the true north when viewed from above, the declination is west, and if in an anti-clockwise direction, the declination is east.

The angle of dip or inclination I is expressed by the equation:

$$I = \sin^{-1}\left(\frac{F_{ZE}}{F}\right) \quad (11)$$
$$= \sin^{+1}(\cos \alpha \cos \beta \cos r \cos p - \sin \alpha \cos \beta \sin p - \sin \beta \sin r \cos p)$$

The horizontal component H is expressed by the equation:

$$H = F \cos I \quad (12)$$

The vertical component, Z is $$Z = F \sin I = F_{ZE} \qquad (13)$$

The magnetic heading, M. H. is $$M.H. = \tan^{-1}\left(\frac{-F_{YE}}{F_{XE}}\right) \qquad (14)$$

$$= \tan^{-1}\left(\frac{+\sin\beta\cos r + \cos\alpha\cos\beta\sin r}{\sin\alpha\cos\beta\cos p - \sin\beta\sin r\sin p + \cos\alpha\cos\beta\cos r\sin p}\right)$$

The foregoing equations appear to be somewhat involved, although the functions consist of only simple trigonometric relations. The computations do not become difficult if the values of the various functions are set up in tabular form and a calculator is employed for securing the answers. If the detector head and pendulum are properly leveled initially, the pendulum angles will be small and $\cos r$ and $\cos p$ can be taken as unity. Also, the term involving $(\sin r)(\sin p)$ becomes negligible.

All of the magnetometer data are continuously recorded except for control box dial settings which are noted on a separate data sheet. In order to obtain a definition on the record chart of less than 0.1 degree in recording the angular data, the aforedescribed bridge circuits are employed.

Alternating current sources are employed for energizing the detector bridge circuits 73 and 77 in view of the close proximity of these circuits to the detector coil, thereby to avoid setting up direct current fields which would interfere with the field to be measured by the detector.

It is apparent from the foregoing description that in employing the method and apparatus of the present invention recordings of the intensity of the earth's magnetic field is correlated with the angle of the earth's magnetic field with respect to the aircraft containing the apparatus, i. e., the $\alpha$ and $\beta$ angles which the detector coil makes with respect to the aircraft, the angle of the aircraft with respect to true vertical, i. e., the aircraft pitch and roll angles $p$ and $r$, and the relative bearing angle $\theta$ of the aircraft with respect to the sun. It is of course, understood that the tapes employed in all of the recording milliammeters are driven by synchronous motors at a constant speed, thus all of the various data recorded at a certain time on all of the tapes and on the photographic record of the sun compass is correlated with respect to time. It is also apparent that by means of a series of surveys employing the apparatus of the present invention the information relating to the earth's total magnetic field vector may be incorporated in a chart covering a large area of the earth's surface.

Charts of this type for world wide coverage are prepared and/or issued by the U. S. Coast and Geodetic Survey and Navy Hydrographic Office.

Obviously many modifications and variations of the present invention are possible in the light of the above teachings. It is therefore to be understood that within the scope of the appended claim the invention may be practiced otherwise than as specifically described.

The invention described herein may be manufactured and used by or for the Government of the United States of America for governmental purposes without the payment of any royalties thereon or therefor.

What is desired to be secured by Letters Patent of the United States is:

Apparatus for measuring and recording the attitude of an aircraft in flight with respect to the direction of the earth's total magnetic field comprising, in combination, magnetic detector means for measuring the total intensity of said field including a gimbal mechanism and a field detector element supported by the gimbal mechanism orienting means for maintaining said field detector element continually aligned with the direction of the field by pivotal movements about the gimbal axes, said gimbal axes being mutually perpendicular to the axis of the detector element, the centerline of the aircraft being parallel with the outer ring of the gimbal mechanism and perpendicular to the outer gimbal axis, means carried by said outer ring for indicating when the plane of said outer ring is perpendicular to true vertical during initial adjustment of the gimbal mechanism to align said detector element axis with true vertical thereby to establish a rectangular coordinate system including true vertical and the centerline of the aircraft and from which to measure angular variations of the aircraft with respect to the axis of the detector element, a pair of potentiometers carried by said gimbal mechanism and respectively mounted for adjustment about said gimbal axes in response to movements of the inner and outer gimbal rings thereabout, and a pair of bridge circuits including said potentiometers and a pair of recording meters individual thereto for measuring and recording said angular variations.

References Cited in the file of this patent

UNITED STATES PATENTS

| Number | Name | Date |
|---|---|---|
| 1,412,586 | Welch | Apr. 11, 1922 |
| 1,863,415 | Rieber | June 14, 1932 |
| 2,464,911 | White | Mar. 22, 1949 |
| 2,482,504 | Pennington | Sept. 20, 1949 |
| 2,488,389 | Felch et al. | Nov. 15, 1949 |
| 2,519,718 | Strobino | Aug. 22, 1950 |
| 2,534,632 | Smith | Dec. 19, 1950 |
| 2,541,213 | Davidson | Feb. 13, 1951 |
| 2,555,209 | Vacquier et al. | May 29, 1951 |
| 2,555,328 | Esval et al. | June 5, 1951 |
| 2,559,586 | Bjarnason | July 10, 1951 |
| 2,598,697 | Jensen | June 3, 1952 |

FOREIGN PATENTS

| Number | Country | Date |
|---|---|---|
| 2,105 of 1911 | Great Britain | Jan. 29, 1912 |